J. R. MOFFATT & R. S. KELSO.
SEWING MACHINE.
APPLICATION FILED DEC. 21, 1916.
1,287,392.
Patented Dec. 10, 1918.
7 SHEETS—SHEET 1.
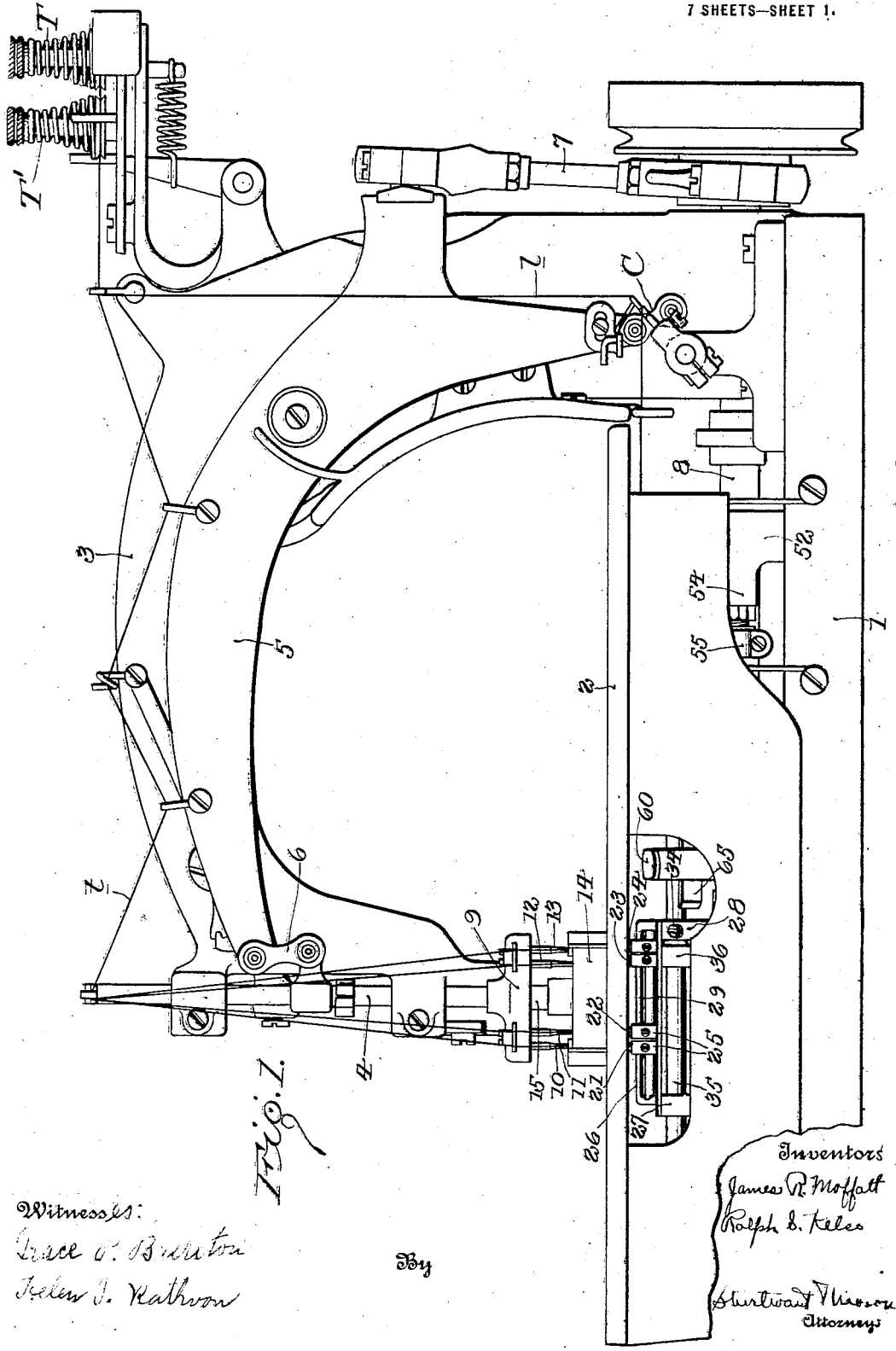
Witnesses:
Inventors
James R. Moffatt
Ralph S. Kelso
By
Sturtevant Mason
Attorneys

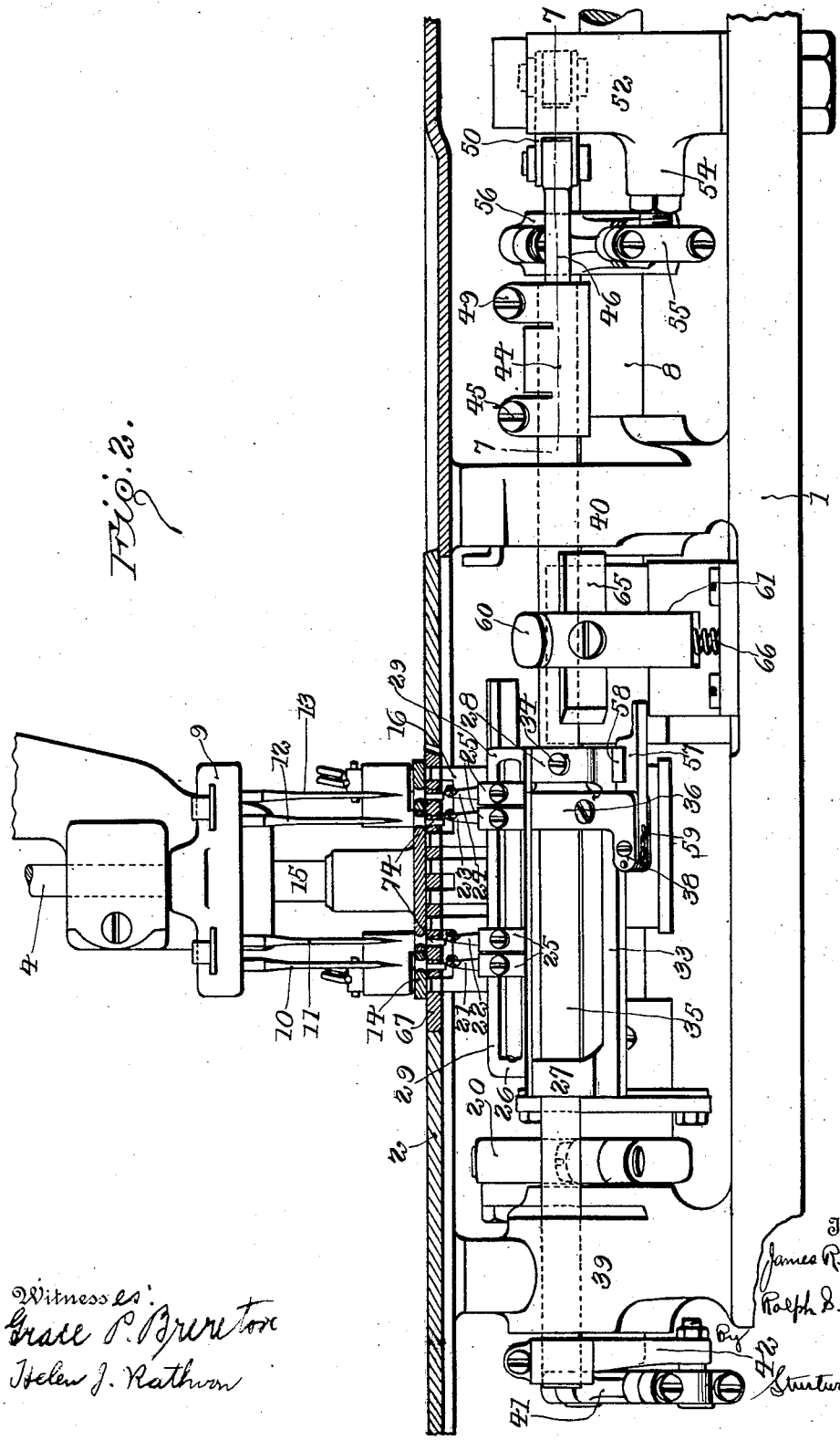

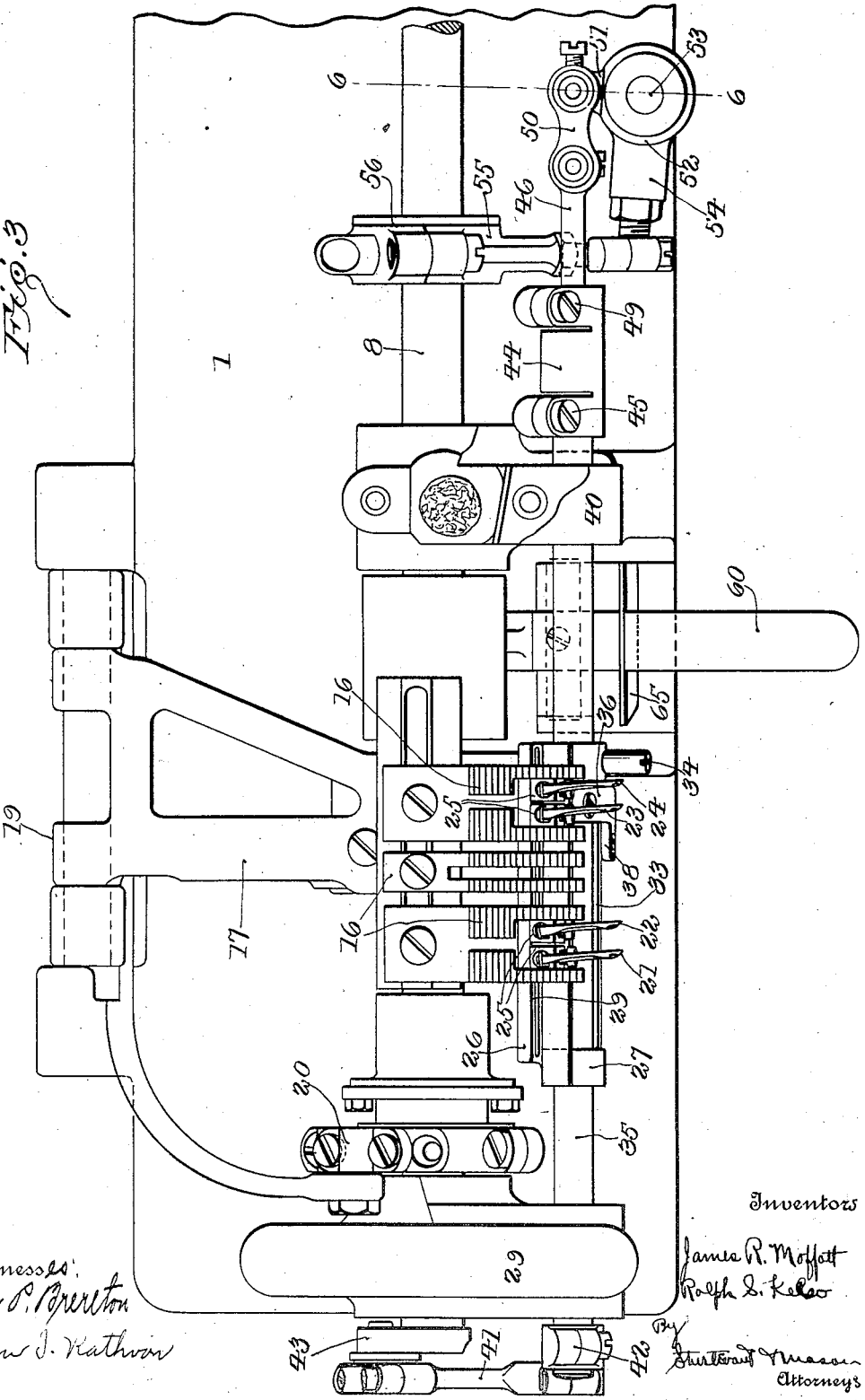

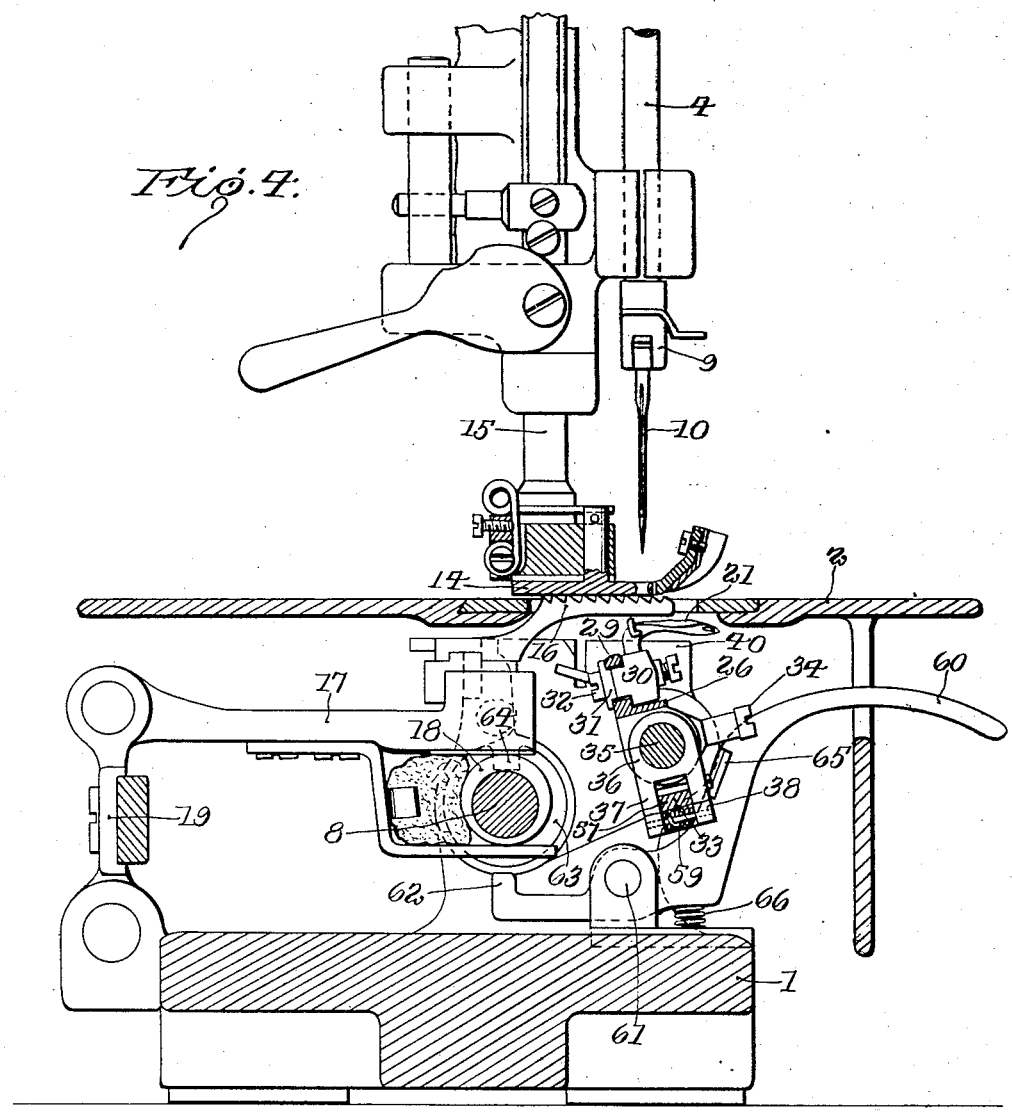

J. R. MOFFATT & R. S. KELSO.
SEWING MACHINE.
APPLICATION FILED DEC. 21, 1916.
1,287,392.
Patented Dec. 10, 1918.
7 SHEETS—SHEET 5.
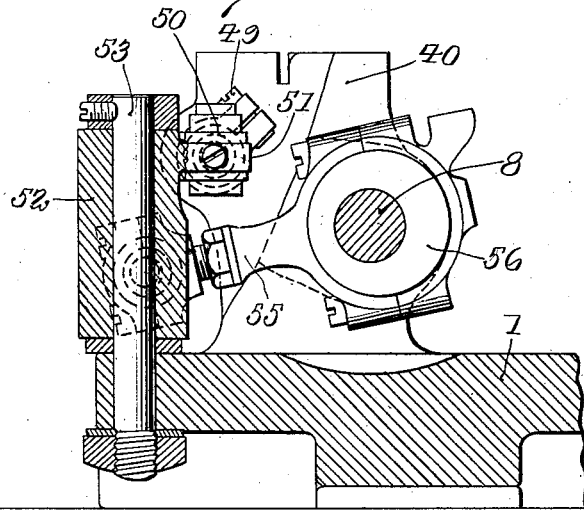
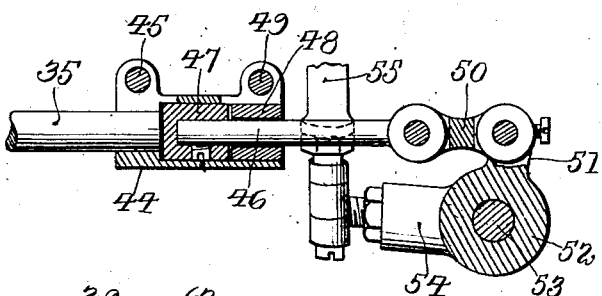
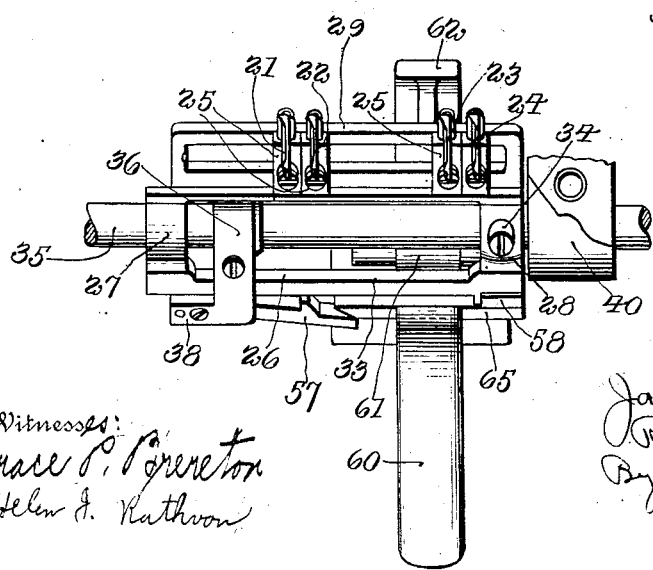
Inventors
James R. Moffatt
Ralph S. Kelso
By Sturtevant Mason
Attorney
Witnesses:
Grace P. Brereton
Helen J. Rathvon

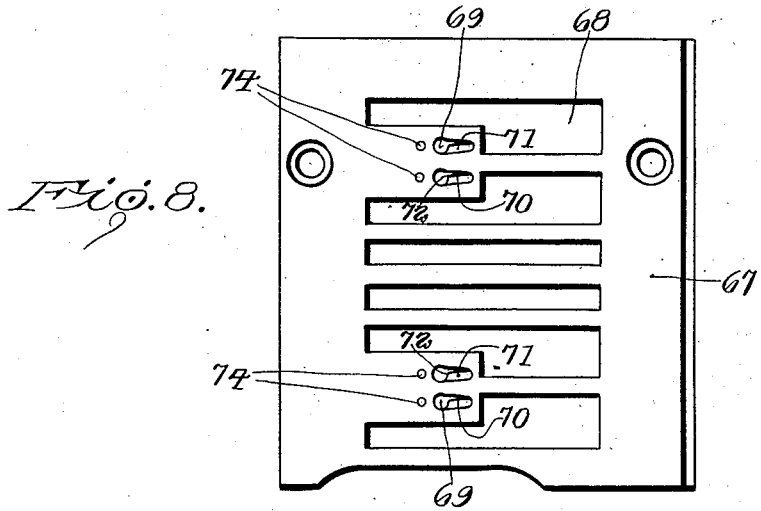
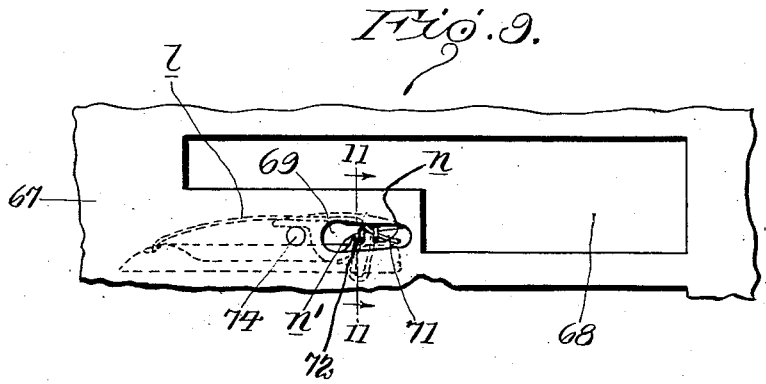
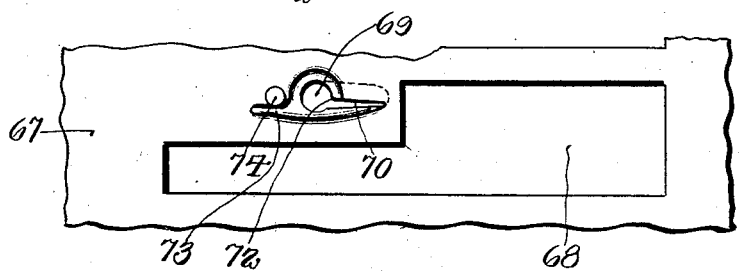
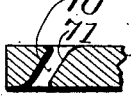

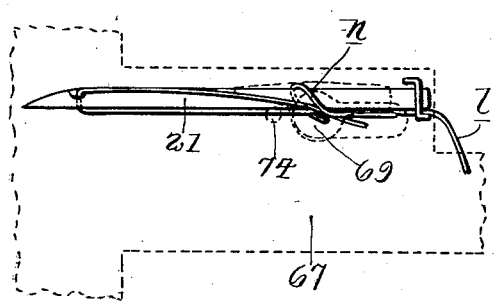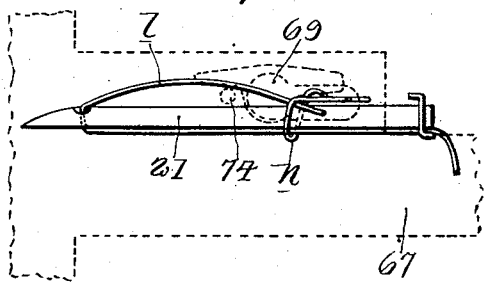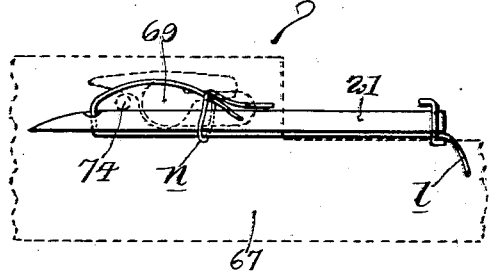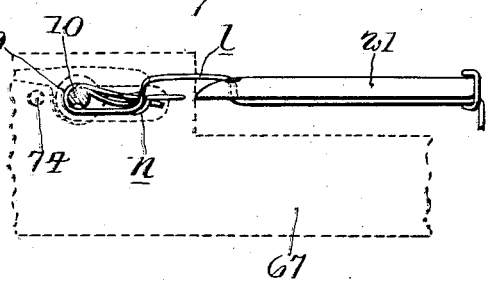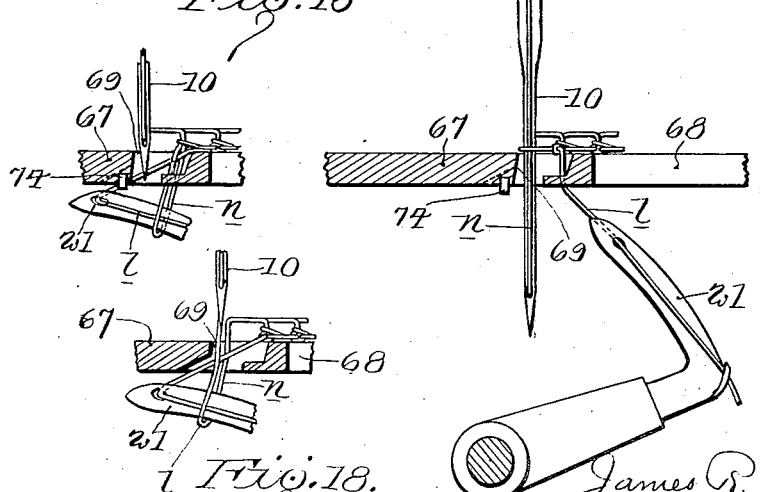

UNITED STATES PATENT OFFICE.

JAMES R. MOFFATT AND RALPH S. KELSO, OF CHICAGO, ILLINOIS, ASSIGNORS TO UNION SPECIAL MACHINE COMPANY, OF CHICAGO, ILLINOIS, A CORPORATION OF ILLINOIS.

SEWING-MACHINE.

1,287,392.

Specification of Letters Patent.     Patented Dec. 10, 1918.

Application filed December 21, 1916. Serial No. 138,221.

*To all whom it may concern:*

Be it known that we, JAMES R. MOFFATT and RALPH S. KELSO, citizens of the United States, residing, respectively, at Chicago, in the county of Cook, State of Illinois, have invented certain new and useful Improvements in Sewing-Machines, of which the following is a description, reference being had to the accompanying drawing and to the figures of reference marked thereon.

The invention relates to new and useful improvements in sewing-machines, and more particularly to the stitch-forming mechanism thereof.

It is well-known that, when a threaded looper moves back and forth on the line of feed and enters the needle loop when moving in a direction opposed to the feed, considerable difficulty is experienced in spreading or separating the looper thread from the body of the looper for the entrance of the needle into the looper thread loop. An object of the present invention is to provide means whereby the feed of the needle thread loop away from the needle by the feeding of the fabric may be utilized to deflect the looper thread which passes therethrough so as to separate the looper thread from the body of the looper and thus spread the looper thread loop.

A further object of the invention is to provide a recess or groove in the under face of the throat plate which is so disposed as to provide a clearance space for the looper thread so that the same may be readily separated from the looper body and the looper thread loop spread.

These and other objects will in part be obvious and will in part be hereinafter more fully disclosed.

In the drawings, which show by way of illustration one embodiment of the invention:—

Figure 1 is a front view of a sewing machine embodying our improvements;

Fig. 2 is a longitudinal sectional view through a portion of the machine, said view being taken substantially on the line of the needles;

Fig. 3 is a plan view of the parts beneath the work support;

Fig. 4 is a view partly in transverse vertical section and partly in elevation, substantially through one of the needles;

Fig. 5 is a detail view in plan showing the loopers, the looper carrier and the latch releasing mechanism which permits the loopers to be moved laterally for threading with the loopers in threading position;

Fig. 6 is a transverse sectional view on the line 6—6 of Fig. 3;

Fig. 7 is a horizontal sectional view on the line 7—7 of Fig. 2;

Fig. 8 is a plan view of the throat plate;

Fig. 9 is an enlarged plan view of a portion of the throat plate showing the needle thread loop and the looper thread deflected thereby;

Fig. 10 is a bottom plan view of that portion of the throat plate shown in Fig. 9;

Fig. 11 is a sectional view on the line 11—11 of Fig. 9;

Fig. 12 is a detail partly in section showing the looper and a portion of the throat plate, the looper being retracted;

Fig. 13 is an enlarged detail partly in section, showing the needle, the looper, a part of the throat plate with the looper partway back on its retracting movement;

Fig. 14 is a diagrammatic view showing the looper, the needle and in dotted lines, the throat plate when the looper is retracted and about to move forward to enter the needle loop;

Fig. 15 is a similar view but showing the looper having entered the needle loop and at the forward end of its stroke;

Fig. 16 is a similar view but showing the looper as having moved laterally and retracted slightly, also showing the needle loop on the looper as having been fed backward by the feed of the material and the looper thread deflected by the needle loop;

Fig. 17 is a similar view but showing the looper further retracted and the looper thread loop positioned so that the needle point may pass between the looper thread and the body of the looper;

Fig. 18 is a detail showing the needle, the looper and the throat plate, said throat plate being in vertical section through the clearance slot for recess in front of the needle opening.

We have shown our invention as applied to a sewing machine which is provided with a supporting base 1, on which is mounted a work support 2. An overhanging arm 3 is carried by the supporting base and a needle bar 4 reciprocates at the forward end of said overhanging arm. Said needle bar is reciprocated by a needle lever 5 which is connected to the needle bar by a link 6. The needle lever is oscillated by an eccentric strap 7 which coöperates with an eccentric on the main shaft 8.

As herein shown, the needle bar is provided with a needle supporting head 9 which carries four needles 10, 11, 12 and 13. These needles are grouped in two pairs. The threads for the needles are led through suitable tensions indicated at T and thence through suitable thread guides carried in part by the needle lever and in part by the needle bar and in part by the overhanging arm. The needle threads are indicated at $t$.

The material is held on the work support 2 by a presser foot 14. This presser foot is carried by a presser bar 15 which is mounted in the overhanging arm. Coöperating with the presser foot is a feed dog 16. This feed dog is carried by a feed bar 17 which is raised and lowered by an eccentric 18 on the main shaft 8. Said feed bar 17 at its rear end is pivoted to a feed rocker 19 and the feed rocker is oscillated by an eccentric strap 20 which coöperates with an eccentric on the main shaft 8. It will be understood that there is a series of feed dogs 16 which are adjustably connected to the feed bar 17 so that they may be shifted laterally of the line of feed if desired.

Coöperating with the needles 10, 11, 12 and 13 respectively, are four loopers 21, 22, 23 and 24. Each of these loopers is a thread carrying looper. That is, it is provided with a thread eye through which the looper thread passes that is to be concatenated with the needle thread loops. Each looper is carried by an independent looper holder and these looper holders are each indicated at 25 in the drawings. A looper carrier 26 consists of two sleeves 27 and 28 which are connected by a slotted cross bar 29. Each looper holder has a rearwardly extending shank, see Fig. 4, which extends into the slot in the slotted cross bar and a cap plate 31 secured to the holder 30 by a screw 32, clamps the holder onto this cross bar 29. This provides a supporting means for the looper which permits the loopers to be independently adjustable and set so as to correspond to the arrangement of the needles on the needle bar. The loopers, as clearly shown in the drawings, are each mounted so that they extend in a line parallel with the line of feed. The looper carrier 26 also has a second cross bar 33 connected to the sleeves 27 and 28, and a small finger piece 34 is secured to the sleeve 28. These sleeves 27 and 28 are mounted to slide freely on a looper supporting shaft 35. A collar 36 is rigidly secured to the looper supporting shaft 35 and this collar is formed with spaced arms 37 and 38, see Fig. 4, through which the cross bar 33 extends. This serves as a means for connecting the looper carrier to the looper supporting shaft so that while it may slide endwise on the shaft, it oscillates with the shaft.

The looper supporting shaft 35 is mounted in suitable bearings 39 and 40 carried by the supporting bed 1. The shaft extends beyond these bearings and is mounted freely in the bearings so it may oscillate therein and also move endwise in the bearings. Said looper supporting shaft is oscillated by means of a link 41 which is connected to a crank arm 42 on the looper supporting shaft and a crank arm 43 on the main shaft 8. As the main shaft rotates the crank arm 43 will rotate, but the crank arm 42 is longer than the crank arm 43 and, therefore, the looper supporting shaft will merely oscillate.

The looper supporting shaft is moved endwise through devices connected to the other end of the looper supporting shaft. On the end of the shaft there is a sleeve 44 which is clamped to the end of said looper supporting shaft by a screw 45. This sleeve 44 projects beyond the end of the looper supporting shaft and a rod 46 extends into the sleeve. A collar 47 is clamped on the end of this rod 46 while a collar 48 is clamped in the end of the sleeve by a screw 49. Said last named collar 48 has an opening therethrough which permits the rod 46 to turn freely in the opening. From the above it will be apparent that the rod 46 when moved endwise will cause the looper supporting shaft to be moved endwise, but the looper supporting shaft is free to oscillate on its connection with the rod 46.

The rod 46 at its outer end is connected by a link 50 with an arm 51 carried by a sleeve 52 which is mounted to oscillate about a vertical post 53. Said sleeve 52 has a second arm 54 which is connected to an eccentric strap 55 and this eccentric strap coöperates with an eccentric 56 on the main shaft 8. As the main shaft rotates, this eccentric 56 will oscillate the sleeve 52 and this sleeve through the link connection 50 and the rod 46 will move the looper supporting shaft endwise.

From the above, it will be apparent that we have provided devices for moving the loopers back and forth into and out of the needle loops and also for moving the loopers laterally, which devices are of few parts, free from springs and irregularly shaped cams so that the machine may be driven at high speed with little undesirable vibration in the parts so that the operating mechanism is very strong and durable.

It will be understood that the means for oscillating the loopers and the means for moving the loopers endwise is timed so that the loopers move forward into the needle loops with little or no lateral movement until the points of the needles are above the loopers, after which the loopers are moved laterally for their needle avoiding movement and during this lateral or needle avoiding movement there is comparatively little backward movement of the loopers. After the loopers have been positioned at the opposite sides of the needles, then they are moved backward with little or no lateral movement, until the points of the loopers have passed the needles, after which they return to their first or initial position.

In a multiple needle machine it is desirable to move the loopers laterally from their normal operating position for the purpose of threading so as to position said loopers at one side of the throat plate and under a removable slide carried by the cloth plate. As above noted, the looper carrier 26 is mounted on the looper supporting shaft 35 so that it may be moved endwise thereon. When the looper carrier is in the position shown in Fig. 2 of the drawings, the collar 28 abuts against the collar 36 so as to prevent the looper carrier from any further movement to the left.

A spring latch 57 which is pivoted between the arms 37 and 38 of the collar 36, engages a plate 58 on the looper carrier and holds said carrier from movement to the right as viewed in this figure. When the latch 57 is released then the carrier is free to be moved laterally on the looper supporting shaft. The latch is forced toward the looper carrier by a spring 59. It is moved away from the looper carrier to release the same by a releasing lever 60. This lever 60 is pivoted at 61 to the bed plate of the machine and projects beyond said pivot where it is provided with an upturned nose 62. On the main shaft 8 there is a collar 63 which is provided with a notch 64. If the main shaft stops with the notch 64 directly over the nose 62 of the lever 60 then said lever may be depressed. When said lever is depressed, a cross bar 65 carried thereby engages the latch 57 and moves the same to release the looper carrier. As long as this lever 60 is held depressed and the carrier released, the shaft of the machine will be locked against movement by reason of this nose 62 engaging the notch 64. As the looper carrier moves in front of the cross bar 65, it will prevent the lever 60 from moving upwardly to release the main shaft and the lever cannot be released from the main shaft until the looper carrier has been returned to its normal position. This insures the returning of the looper carrier to its normal position before the machine can be started. The lever 60 is automatically released by a spring 66, when the looper carrier has been returned to its operative position.

The looper threads are indicated at $l$ in the drawings. These looper threads pass through suitable tensions, indicated at T' and thence through a thread controlling mechanism, indicated at C and from this thread controlling mechanism, the threads pass through suitable guides to the loopers.

The needles are arranged abreast, that is, in a line at right angles to the line of feed. The loopers are thread carrying loopers and have their loop taking and loop giving movements in the general direction parallel to the line of feed, the loop taking movements being in a direction opposite the direction of feed. Where a looper is arranged as above noted it is necessary to provide means of some character to spread the loop of the looper thread and maintain said loop spread until the needle in its next descent has entered said thread loop. This is necessary because the strand of looper thread which extends rearwardly from the eye of the looper to the last formed concatenation is moved over with the looper to the wrong side of the path of the needle. Although the first part of the backward movement of the looper causes this strand of the looper thread to become bowed, there is no means for compelling the looper thread to become positively bowed and maintained in such position relative to the needle, whereby said needle will with certainty pass between said strand of the looper thread and the body of the looper and thus enter the needle thread loop. In order to provide means for positively bowing the looper thread to separate it from the looper body and thus spread the looper thread loop, we have provided a special construction of throat plate. Said throat plate is indicated at 67 in the drawings and has the usual feed slot 68 and needle openings 69 one opening for each needle. We will describe the special construction of the throat plate relative to a single needle and looper, it being understood that the same construction is used in connection with each needle and each looper.

The throat plate 67 has a slot 70 extending rearwardly from the needle opening 69. This slot 70 is inclined, as clearly shown in Fig. 11 of the drawings, thus forming an inclined face 71 and a shoulder 72. On the under surface the throat plate is formed with a recess 73 which extends to one side and forwardly from the needle opening to form a clearance space for the looper thread. The slot 70 is slightly at one side of the center of the needle opening. The purpose of the inclined face of this slot is to cause the needle thread loop, which is around the looper, and which has been fed against said inclined face, to deflect the looper thread, which extends through the needle loop, away from the body of the looper. As the fabric is fed rearwardly away from the needle, the previous interlocking of the threads moves away from the needle opening in the throat plate and this carries the shank of the needle loop which is now around the looper, (the looper being forward) into the slot 70.

It will be noted that as the looper reaches the forward end of its stroke and before the lateral or needle-avoiding movement thereof takes place, the strand of looper thread which extends rearwardly from the forward eye of the looper and through the needle thread loop which is around the looper and thence to the last formed concatenation, extends upwardly through the groove 73, needle hole and slot 70. The groove 73 gives a sufficient clearance for said strand so that the latter will be disposed in a substantially straight line, and as a result of this clearance the strand of looper thread will be devoid of any frictional contact with the throat plate.

As the needle loop is carried back into the slot the strand of the needle loop indicated at n in Fig. 9 moves into the slot first while the strand indicated at n' engages the shoulder 72 and will be retarded and pass into the slot, after the strand n. In other words, the shank of the needle loop will be given a quarter-twist as it is moved back into this slot 70, leading from the needle opening rearwardly thereof. The looper thread which is indicated at l in the drawings, at this time extends through the needle loop at the shank thereof and the quarter-twist of the needle loop will cause the looper thread to be deflected or bowed outwardly away from the body of the looper, as clearly shown in Figs. 9, 16 and 17 of the drawings. That is to say, this positioning of the shank of the needle loop will serve as a means for deflecting the looper thread away from the body of the looper and thus spread the looper thread loop so as to insure the needle, when it moves downwardly, entering the looper thread loop. The throat plate on its under face is provided with a pin 74 which is located just in advance of the needle opening and the looper thread which is deflected laterally will be passed around this pin as the looper moves backwardly so that the pin serves as a retainer for holding the spread loop open, thus further insuring the needle entering the looper thread loop and thereby positively preventing any skipping.

The throat plate, per se, with its means for causing the needle thread loop to deflect the looper thread, forms no part of the present invention, but is shown, described and claimed in our co-pending application, Serial Number 138,223, filed of even date herewith.

It is obvious that minor changes in the details of construction and arrangement of parts may be made without departing from the spirit of the invention, as set forth in the appended claims.

Having thus described the invention, what is claimed as new is:—

1. A stitch-forming mechanism for sewing machines including in combination, a feeding mechanism, a needle, a looper, means for moving said looper in the line of feed during its loop-taking and loop-shedding movements, means for giving said looper a lateral needle avoiding movement while in the needle thread loop, and means for separating the looper thread extending from the looper through the needle thread loop to the last formed thread concatenation from the body of the looper for spreading the looper thread loop for the entrance of the needle, said last-named means including means acting upon the needle thread loop during the feeding movement of the material to compel said loop to move the looper thread outwardly from the body of the looper during the backward movement of the looper.

2. A stitch-forming mechanism for sewing machines including in combination, a feeding mechanism, a needle, a looper, means for moving said looper in the line of feed during its loop-taking and loop-shedding movements, means for giving said looper a lateral needle avoiding movement while in the needle thread loop, and means for separating the looper thread extending from the looper through the needle thread loop to the last formed thread concatenation from the body of the looper for spreading the looper thread loop for the entrance of the needle, said last-named means including a slotted throat plate which slot is so disposed relative to the needle as to receive the needle thread loop during the feeding movement of the material and give to said needle loop a partial twist whereby said needle loop causes the looper thread to be moved outwardly from the body of the looper during the backward movement of the looper.

3. The combination of a work support, a feeding mechanism, a needle, a looper cooperating with the needle and arranged to move back and forth in a direction substantially parallel to the line of feed, a throat plate carried by the work support and having a needle opening therein and a slot extending rearwardly from the needle opening, one wall of said slot being inclined to the plane of the work support and disposed relative to the needle opening whereby the needle thread loop on the looper when it is moved rearwardly by the feed dog into said slot will be given a partial twist so as to cause the looper thread extending through the needle loop to be deflected away from the body of the looper and the looper thread loop spread for the entrance of the needle.

4. The combination of a work support, a feeding mechanism, a needle, a looper cooperating with the needle and arranged to move back and forth in a direction substantially parallel to the line of feed, a throat plate carried by the work support and having a needle opening therein and a slot extending rearwardly from the needle opening, one wall of said slot being inclined to the plane of the work support and disposed relative to the needle opening whereby the needle thread loop on the looper when it is moved rearwardly by the feed dog into said slot will be given a partial twist so as to cause the looper thread extending through the needle loop to be deflected away from the body of the looper and the looper thread loop spread for the entrance of the needle, said throat plate having a recess or groove at the side of the needle thread and in front thereof in order to give a clearance space for the looper thread.

5. The combination of a work support, a feeding mechanism, a needle, a looper cooperating with the needle and arranged to move back and forth in a direction substantially parallel to the line of feed, a throat plate carried by the work support and having a needle opening therein and a slot extending rearwardly from the needle opening, one wall of said slot being inclined to the plane of the work support and disposed relative to the needle opening whereby the needle thread loop on the looper when it is moved rearwardly by the feed dog into said slot will be given a partial twist so as to cause the looper thread extending through the needle loop to be deflected away from the body of the looper and the looper thread loop spread for the entrance of the needle, said throat plate having a projection on its under face in front of the needle opening for retaining the looper thread spread for the entrance of the needle.

6. The combination of a work support, a feeding mechanism, a needle, a looper cooperating with the needle and arranged to move back and forth in a direction substantially parallel to the line of feed for its loop-taking and loop-shedding movements, means for moving said looper back and forth, means for moving said looper laterally for giving a needle avoiding movement thereto, a throat plate carried by the work support and having a needle opening therein and a slot extending rearwardly from the needle opening, one wall of said slot being inclined to the plane of the wall of the work support, said slot being so disposed relative to the needle opening as to form a shoulder for engaging the strand of the needle thread loop when it is moved rearwardly by the feeding mechanism into said slot, said shoulder operating to retard the strands of the needle thread loops so that they move one after the other into the slot thus giving a partial twist to the needle thread loop whereby said needle thread loop is caused to deflect the looper thread extending therethrough away from the body of the looper for spreading the looper thread loop for the entrance of the needle.

7. The combination of a work support, a feeding mechanism, a needle, a looper cooperating with the needle and arranged to move back and forth in a direction substantially parallel to the line of feed for its loop-taking and loop-shedding movements, means for moving said looper back and forth, means for moving said looper laterally for giving a needle avoiding movement thereto, a throat plate carried by the work support and having a needle opening therein and a slot extending rearwardly from the needle opening, one wall of said slot being inclined to the plane of the wall of the work support, said slot being so disposed relative to the needle opening as to form a shoulder for engaging the strand of the needle thread loop when it is moved rearwardly by the feeding mechanism into said slot, said shoulder operating to retard the strands of the needle thread loops so that they move one after the other into the slot thus giving a partial twist to the needle thread loop whereby said needle thread loop is caused to deflect the looper thread extending therethrough away from the body of the looper for spreading the looper thread loop for the entrance of the needle, said throat plate having a recess formed in its under face adjacent the needle opening and in front thereof in order to provide a clearance space for the looper thread.

8. The combination of a work support, a feeding mechanism, a needle, a looper cooperating with the needle and arranged to move back and forth in a direction substantially parallel to the line of feed for its loop-taking and loop-shedding movements, means for moving said looper back and forth, means for moving said looper laterally for giving a needle avoiding movement thereto, a throat plate carried by the work support and having a needle opening therein and a slot extending rearwardly from the needle opening, one wall of said slot being inclined to the plane of the wall of the work support, said slot being so disposed relative to the needle opening as to form a shoulder for engaging the strand of the needle thread loop when it is moved rearwardly by the feeding mechanism into said slot, said shoulder operating to retard the strands of the needle thread loops so that they move one after the other into the slot thus giving a partial twist to the needle thread loop whereby said needle thread loop is caused to deflect the looper thread extending therethrough away from the body of the looper for spreading the looper thread loop for the entrance of the needle, said throat plate having a projection on its under face in front of the needle opening for engaging the looper thread and retaining the looper thread loops spread for the entrance of the needle.

In testimony whereof we affix our signatures in the presence of two witnesses.

JAMES R. MOFFATT.
RALPH S. KELSO.

Witnesses:
S. GEORGE TATE,
F. C. BUTLER.